United States Patent
Musil

(10) Patent No.: US 8,061,931 B2
(45) Date of Patent: Nov. 22, 2011

(54) TRACKLESS TACK PRE-COATING SYSTEM AND METHOD FOR HOT MIX ASPHALT PAVING

(75) Inventor: Joseph E. Musil, Ely, IA (US)

(73) Assignee: Terex USA, LLC, Wilmington, DE (US)

( * ) Notice: Subject to any disclaimer, the term of this patent is extended or adjusted under 35 U.S.C. 154(b) by 187 days.

(21) Appl. No.: 12/421,121

(22) Filed: Apr. 9, 2009

(65) Prior Publication Data

US 2009/0257824 A1 Oct. 15, 2009

Related U.S. Application Data

(60) Provisional application No. 61/044,091, filed on Apr. 11, 2008.

(51) Int. Cl.
*E01C 19/17* (2006.01)
(52) U.S. Cl. ........................ 404/111; 404/101
(58) Field of Classification Search .................. 404/101, 404/102, 107–111, 118
See application file for complete search history.

(56) References Cited

U.S. PATENT DOCUMENTS

| | | | | |
|---|---|---|---|---|
| 1,397,045 | A * | 11/1921 | Finley | 239/129 |
| 2,372,065 | A * | 3/1945 | Etnyre | 239/119 |
| 5,549,457 | A * | 8/1996 | Flores et al. | 404/84.05 |
| 5,735,634 | A * | 4/1998 | Ulrich et al. | 404/102 |
| 5,895,173 | A * | 4/1999 | O'Brien et al. | 404/108 |
| 5,957,621 | A * | 9/1999 | Clark et al. | 404/111 |
| 6,712,895 | B1 * | 3/2004 | Hoad | 106/122 |
| 7,488,138 | B2 * | 2/2009 | Buschmann | 404/111 |
| 7,572,081 | B2 * | 8/2009 | Buschmann | 404/111 |
| 7,632,038 | B2 * | 12/2009 | Buschmann et al. | 404/111 |
| 2009/0097918 | A1 * | 4/2009 | Larson et al. | 404/75 |
| 2009/0269134 | A1 * | 10/2009 | Wingo et al. | 404/17 |

OTHER PUBLICATIONS

Applicant Admitted Prior Art—Author unknown, "Spray Paver", Roadtec, an Astec Industries Company. Document was downloaded from www.roadtec.com/downloads, SprayPaver.pdf on Apr. 13, 2010. Relevant pp. 1-4; date of publication is Apr. 13, 2010; place of publication is unknown.

Author unknown, Voegele Super 1800-2 with Spray Jet Module. This document was downloaded from www.voegele.info/en/produkte/spezialgeraete/super_18002_mit-spruehmodul_sprayjet/SUPER_1-2_mit_Spraehmodul_SprayJet_-_Einzelseite.php on Apr. 13, 2010. Relevant pp. are 1-5. This document is not admitted as prior art.

* cited by examiner

*Primary Examiner* — Raymond Addie
(74) *Attorney, Agent, or Firm* — Simmons Perrine Moyer Bergman PLC

(57) ABSTRACT

A tack emulsion pre-coating system for use in hot mix asphalt plant paving which comprises providing a triangular-shaped tack emulsion cart deployed ahead of a paver, and configured to operate under a conveyor from a transfer vehicle supplying the paver with HMA, where the cart comprises a forward spray bar which sprays tack emulsion on a surface located between the wheels of the paver so as not to leave tracks and with rear spray bars for spraying tack emulsion behind the wheels, but not behind a central area between the wheels of the paver.

12 Claims, 17 Drawing Sheets

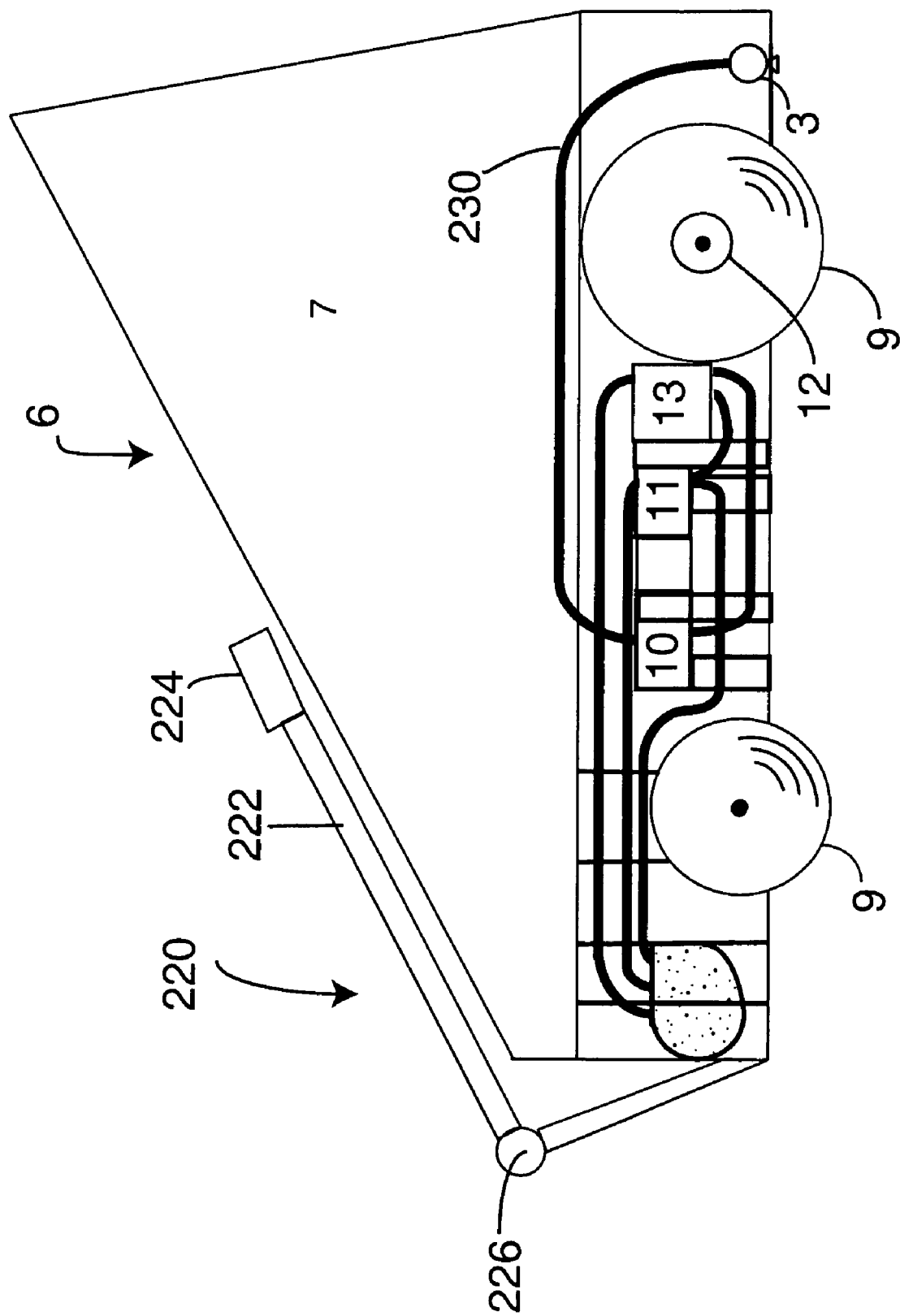

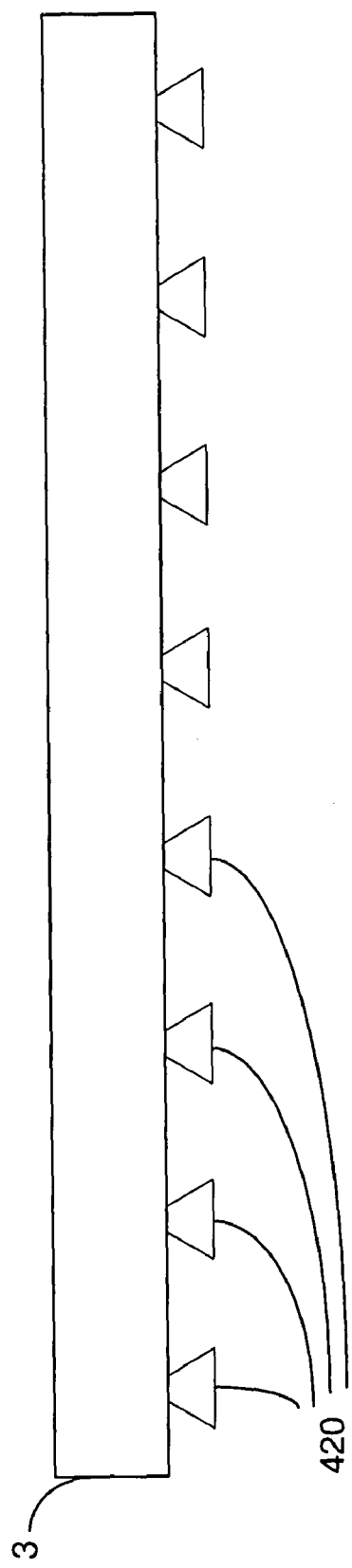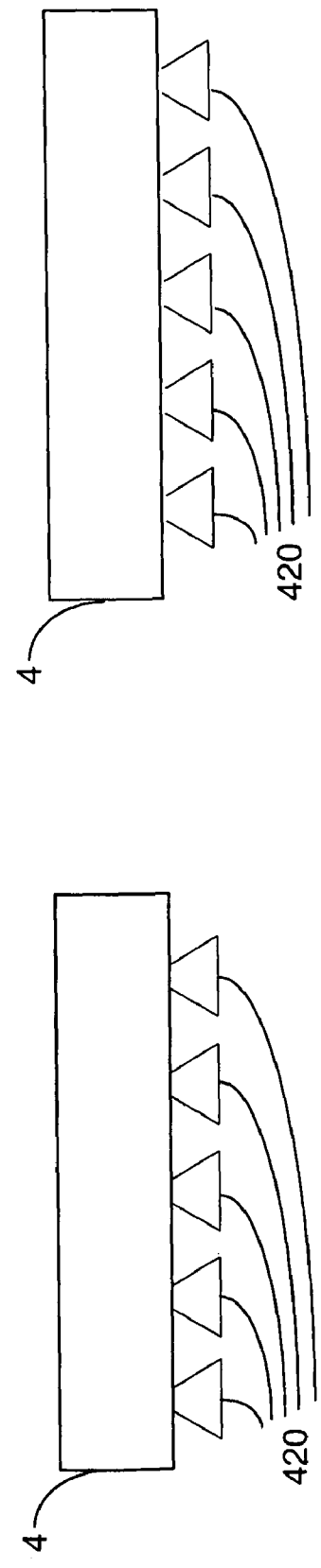

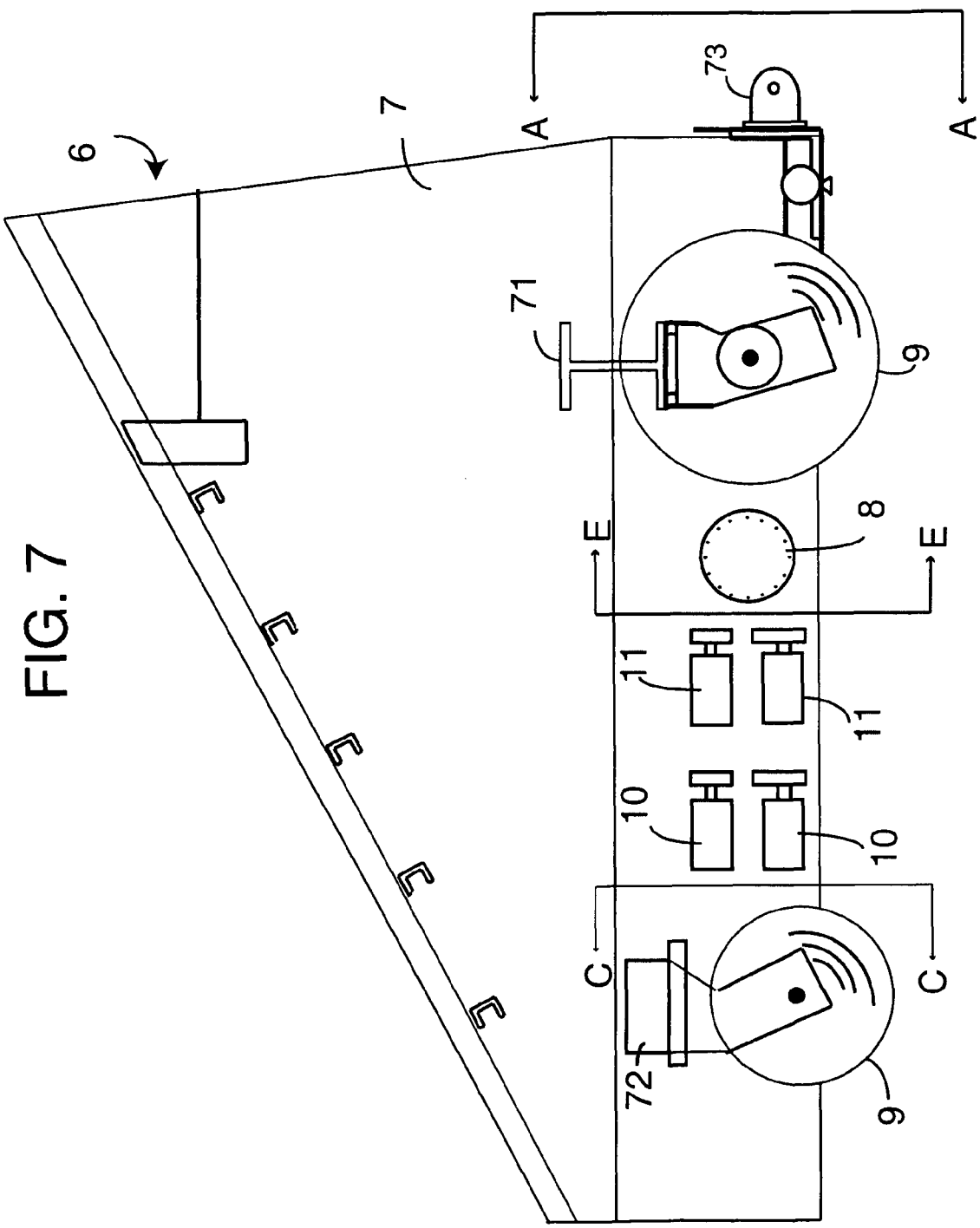

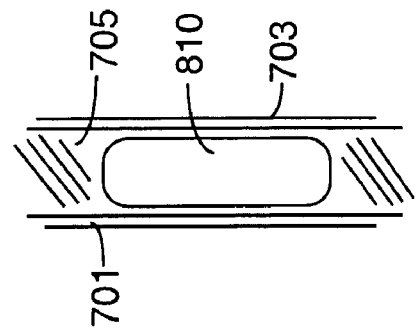
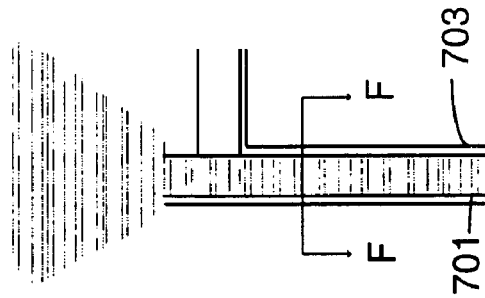
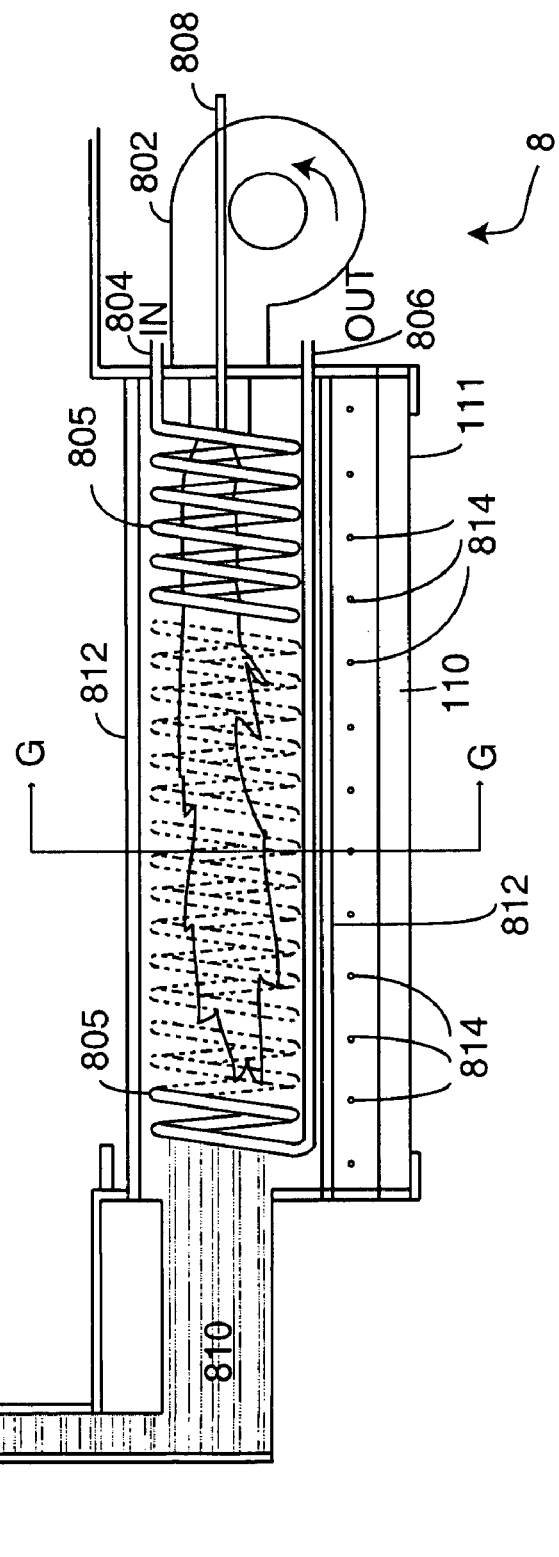
FIG. 13
FIG. 12

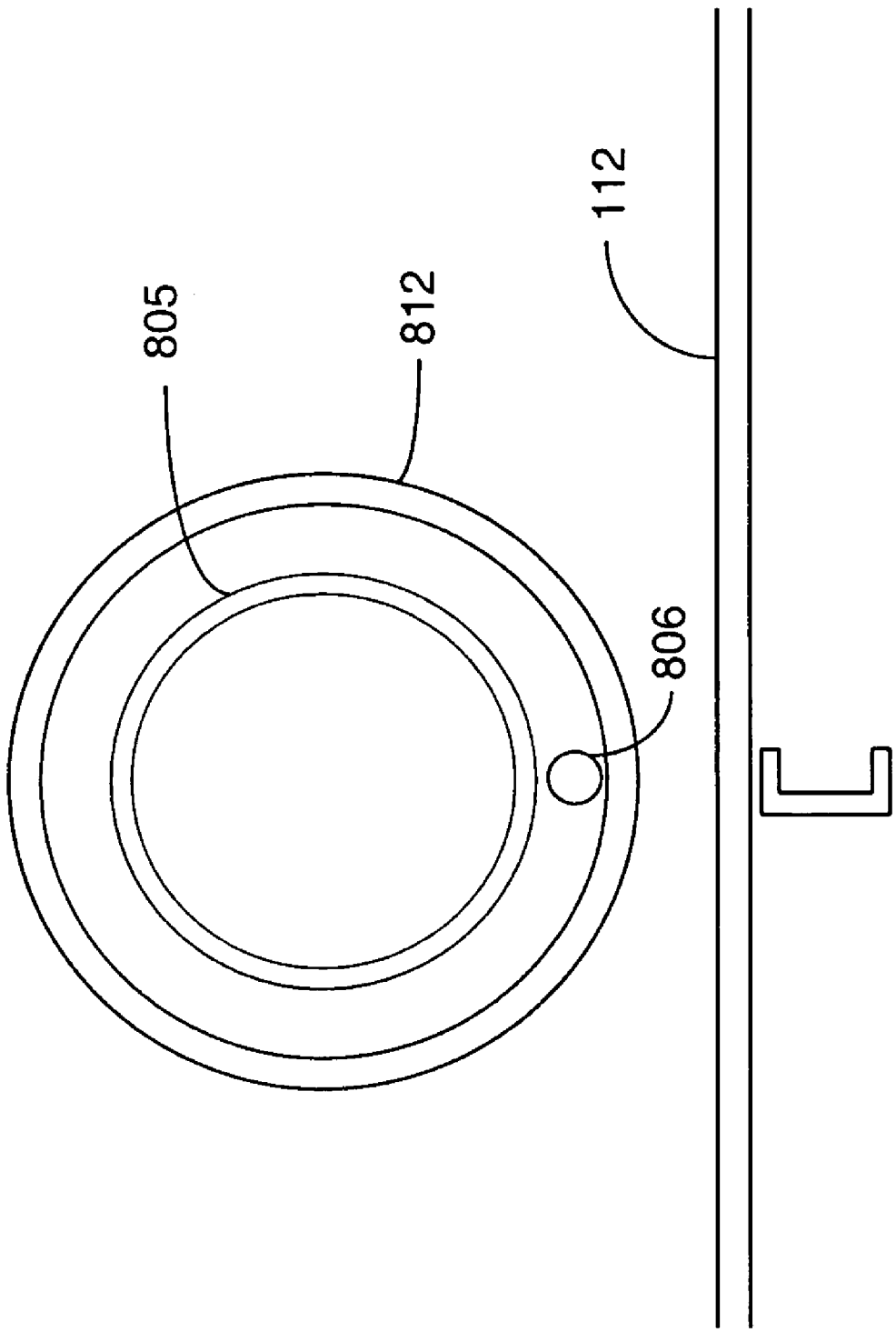

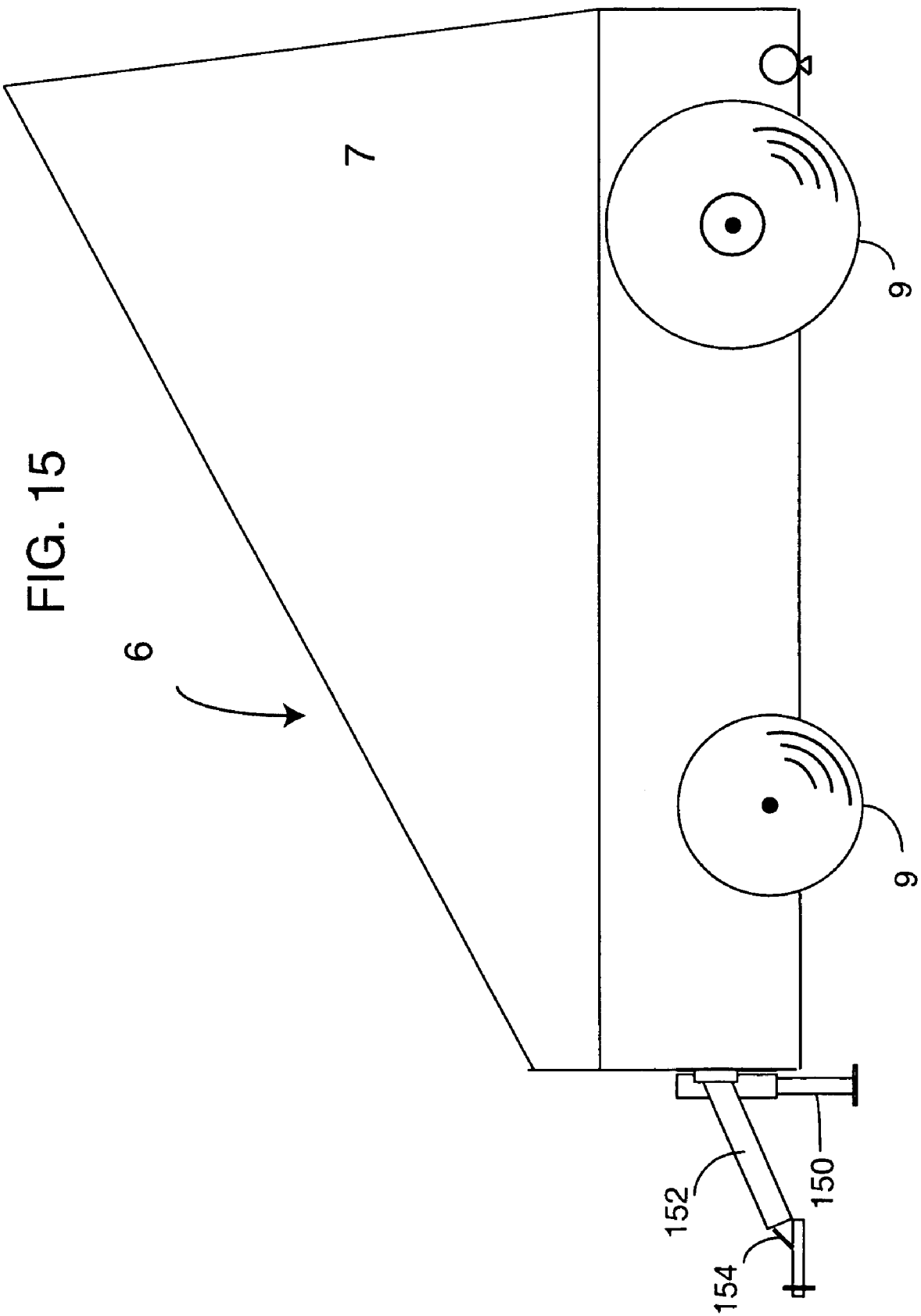

TRACKLESS TACK PRE-COATING SYSTEM AND METHOD FOR HOT MIX ASPHALT PAVING

CROSS REFERENCE TO RELATED APPLICATIONS

This application claims the benefit of a provisional application filed on Apr. 11, 2008, and having application No. 61/044,091.

BACKGROUND OF THE INVENTION

This invention relates to hot mix asphalt (HMA) paving. More specifically, this invention relates to methods and systems for applying a trackless pre-coat of tack or emulsion as part of HMA paving. Note, the present system and method could also be used for warm mix asphalt paving or seal coating or similar applications.

Several techniques and numerous equipment arrangements for the pre-coating tack or emulsion in "hot mix" or "HMA" paving are known from the prior art. For example, a pre-coat of tack has been applied in the past as follows: a tanker truck with tack emulsion therein and a spray bar thereon sprays the road surface with tack. The paver then applies a new layer of HMA over the tack and the old HMA layer; however, the paver leaves tracks in the tack, so that the new layer of HMA does not have uniform bonding to the lower older layer of HMA because of the tracks in the tack coat. Non-uniform bonding of the new HMA layer can result in premature deterioration of the road surface.

At least one road building equipment manufacturer has developed a specially designed spray paver. It utilizes a gravity fed hopper of HMA to a screed and a full paver width tack or emulsion spray bar behind the rear wheels and ahead of the screed.

While these methods are well known in the art, they have the following drawbacks. The gravity fed paver has inherent problems, such as difficulty in loading HMA directly from trucks and a limited HMA load capacity. Also, the specially designed limited (not general purpose) paver is much more expensive than a much more versatile general purpose paver which can be used with or without a detachable asphalt/emulsion pre-coat cart of the present invention.

Consequently, there exists a need for an efficient system and method for applying a tack pre-coat during HMA asphalt paving.

SUMMARY OF THE INVENTION

More specifically, an object of the invention is to provide a trackless HMA tack pre-coating system and method.

Another object of the invention is to provide a tack pre-coating system and method which utilizes general purpose HMA pavers.

It is a feature of the present invention to use a detachable castered push cart disposed ahead of the paver.

It is another feature to apply a pre-coat ahead of the paving in areas between the paver's ground wheels or tracks and then applied also behind the paver's ground wheels, but with a gap between the paver's wheels where the tack was applied ahead of the paver.

The present invention includes the above-described features and achieves the aforementioned objects.

Accordingly, the present invention comprises a hot mix asphalt (HMA) paving system comprising:

a paver comprising a right side surface contacting drive system and a left side surface contacting drive system;

means for applying a first segment of a pre-coat of tack emulsion on a road surface immediately ahead of the paver, which paver is configured to apply a layer of HMA over the pre-coat of tack emulsion;

means for spraying in a segmented pre-coat tack pattern, which does not extend substantially uninterrupted along a line behind the paver spanning from across the right side surface contacting drive system to an opposite side of the left side surface contacting drive system and still ahead of a point where HMA is unloaded and dropped down to the road surface.

Accordingly, the present invention also comprises a method for pre-coating emulsion or tack while paving asphalt comprising the steps of:

applying, on a surface for receiving a layer of hot mix asphalt (HMA), with a front tack spray bar, a first segment of a pre-coat of tack emulsion on the surface ahead of a paver which paver is configured to apply the layer of HMA;

providing a paver with a right side surface contacting drive system and a left side surface contacting drive system with a rear tack spray bar disposed and configured to spray tack emulsion behind the right side surface contacting drive system and the left side surface contacting drive system and ahead of a point where HMA is applied on the surface;

spraying a second segment of the pre-coat of tack emulsion behind the right side surface contacting drive system and the left side surface contacting drive system, but in a segmented pre-coat tack pattern which is substantially non-continuous along a line behind the paver which is receiving the layer of HMA.

The invention also comprises:

a hot mix asphalt (HMA) paving system comprising:

a paver having a right side wheel set and a left side wheel set;

a screed coupled to and pulled behind the paver;

a cart having a caster thereon which permits the cart to roll in any direction over a road surface;

the cart positioned and configured to be pushed forward by a front portion of the paver when the paver is operated to pave an HMA road surface;

the cart further comprising:

a tack emulsion tank, for holding tack emulsion to be sprayed on a road surface;

a tack emulsion pump configured to pump tack emulsion from the tack emulsion tank;

an oil heater circulation pump which is configured to distribute hot oil to heat the tack emulsion as it is being pumped;

an oil tank heater configured to heat oil to create the hot oil;

a front tack spray bar system coupled to and receiving tack emulsion from the tack emulsion pump and configured to spray tack emulsion on a wide road surface ahead of the paver, but substantially except where the right side wheel set and the left side wheel set contact the road surface as the paver pushes the cart;

a rear tack spray bar system coupled to and receiving tack emulsion from the tack emulsion pump and further coupled to a rear portion of the paver behind the right side wheel set and the left side wheel set; and configured to spray substantially more tack emulsion in areas on the surface where the front tack spray bar did not spray tack emulsion and substantially less tack emulsion on areas of the road surface where the front tack spray bar did spray tack emulsion.

BRIEF DESCRIPTION OF THE DRAWINGS

In the following description of the drawings, in which like reference numerals are employed to indicate like parts in the various views:

FIG. 2 is a partial cut-away close-up side view of the asphalt/emulsion pre-coat cart 6 of FIG. 1.

FIG. 5 is a side view of the front tack spray bar 3 of FIGS. 1-4.

FIG. 6 is a side view of the rear tack spray bars 4 of FIG. 1, with one being a left hand side bar and the other a right hand side bar FIG. 7 is a side view of an asphalt/emulsion pre-coat cart of an alternate embodiment.

FIG. 12 is a cross-sectional view of the oil heater taken on lines E-E of FIG. 7

FIG. 13 is a cross-sectional view of the side wall and exhaust outlet taken on lines F-F of FIG. 12.

FIG. 14 is a cross-sectional view of the oil heater coil taken on lines G-G of FIG. 12.

FIG. 15 is a side view of an alternate asphalt/emulsion pre-coat cart of the present invention.

DETAILED DESCRIPTION OF THE DRAWINGS

Figure 1:
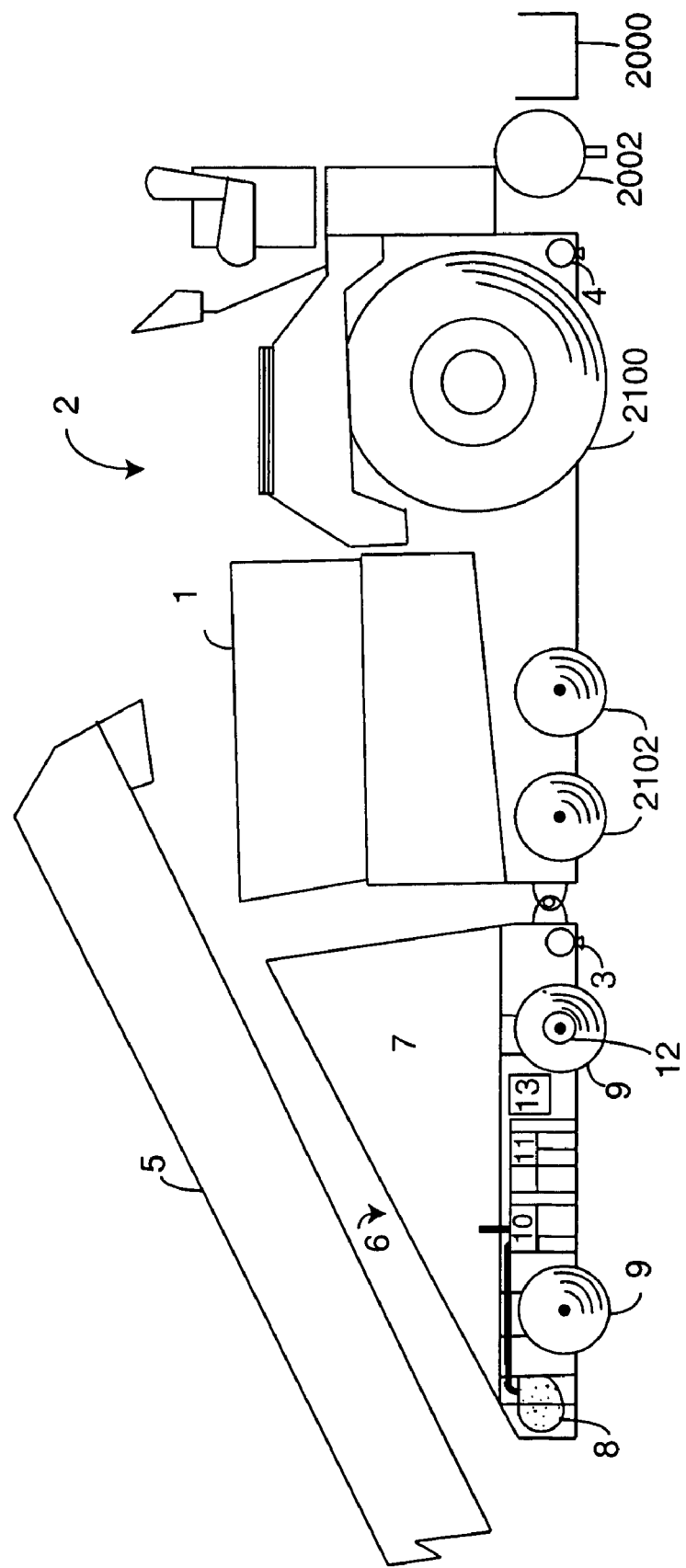
FIG. 1 is a partial cut-away side view of an asphalt paving system of the present invention.

Referring now to the drawings, where like numerals refer to like matter throughout, attention is first directed to a system of the present invention as shown in the illustration of FIG. 1. FIG. 1 shows a general purpose paver 2 which is similar to those well known in the art, and preferably may be outfitted with spreading screw 2002 and an electric heated screed 2000. In a preferred embodiment, general purpose prior art paver 2 with electric heated screed 2000 also has a frame raise feature and replaceable tool attachments with a blind mateable quick connection feature of the prior art. Also, FIG. 1 shows a wheeled paver. It should be understood that the present invention applies to steel and rubber-tracked pavers as well. Optional hopper insert 1 is shown to extend the volume of the hopper of the paver 2. Paver 2 could be a typical slat conveyor paver or an HMA dribble-less remix auger paver, or the like.

The system of the present invention includes an asphalt/emulsion pre-coat cart 6 which is designed to be pushed in any direction on 360-degree rotatable heavy duty casters 9 by a paver 2 during operation and designed to spray a tack emulsion spray on a road surface prior to paving with paver 2. Front tack spray bar 3 is disposed on the rear of asphalt/emulsion pre-coat cart 6 and is configured to spray between the tires or tracks of the paver 2, which is pushing the asphalt/emulsion pre-coat cart 6. Front tack spray bar 3 can be adjustable or a system of adjustable spray bars (see FIGS. 5, 6, 16 and 18 below and accompanying text).

The full desired width of the application of the tack emulsion is accomplished by combining the spraying of front tack spray bar 3 with the spraying of rear tack spray bars 4, (one RH and the other LH) which are configured to spray behind the wheels or tracks of paver 2, but not in the gap between the paver wheels or tracks. Note: The system could utilize one front tack spray bar 3 which could extend outside of the tracks made by the paver so as to coat both between the paver wheels and outside the paver wheels, but not where the paver wheels would drive over the sprayed tack coat. The asphalt/emulsion pre-coat cart 6 of the present invention could have a fixed central spray bar for spraying between the paver wheels and adjustable width outside spray bars for spraying outside the paver wheels (see FIGS. 16, 18 and 21). In an alternate embodiment, rear tack spray bar 4 can be a system which spans the entire width of the paver 2 or a screed 2000 coupled to paver 2, and it may be adjustable in width or with remotely controllable spray nozzles (See FIG. 6 and accompanying text.)

Transfer vehicle HMA delivery conveyor 5 is shown as a portion of a prior art HMA transfer delivery vehicle often used to transfer HMA into a paver. The front portion of the transfer vehicle is not shown.

Asphalt/emulsion pre-coat cart 6 may be coupled to the paver 2 by a blind-mateable quick connector or other means for keeping the asphalt/emulsion pre-coat cart 6 aligned with the paver. Asphalt/emulsion pre-coat cart 6 may include a tack/emulsion tank 7 which could be insulated, or not, and approximately 2000 gallons in size (or larger or smaller, depending upon a particular application). Tack/emulsion tank 7 could be heated by diesel fuel fired hot oil tank heater 8 or not and could be coupled to the fuel system of the paver via a quick connect or could utilize its own diesel fuel tank. Electric or other fuel heaters could also be used. In one embodiment, tack/emulsion tank 7 could be jacketed with a hot oil heating jacket receiving hot oil from the diesel fuel fired hot oil tank heater 8 and circulated by hot oil heater circulation pump 11. It may be preferred that hot oil radiators be disposed inside of tack/emulsion tank 7 in lieu of or in addition to the hot oil heating jacket. The temperature and flow rate of the hot oil could be controlled by control system computer 13 and a network of sensors and input/output controls and monitors. Control system computer 13 could also control the temperature and rate that the tack or emulsion is sprayed with the aid of tack/emulsion pump 10. The tack or emulsion may be pumped to the front tack spray bar 3 and rear tack spray bar 4 by a network of pipes, hoses, quick connectors, etc., all of which could be heated by contact with pipes carrying hot oil from diesel fuel fired hot oil tank heater 8 and circulated by hot oil heater circulation pump 11. A wheel tachometer/speed pickup 12 could be placed on one of the axels/wheels to provide data on the speed of the asphalt/emulsion pre-coat cart 6. In certain applications, the control system computer 13 could also electronically control the spraying status, volume and spray pattern by including but not limited to tack adjustable spray nozzles which could be hard wired or wireless sophisticated electronic tack/emulsion spray nozzles.

Now referring to FIG. 2, there is shown an embodiment of the asphalt/emulsion pre-coat cart 6 of the present invention, which includes a folding tow tongue 220 with folding tow tongue side supports 222, folding tow tongue end coupler 224 and a folding tow tongue pivot member 226. Folding tow tongue 220 is provided so that when paving is completed and the asphalt/emulsion pre-coat cart 6 is no longer in use, it can be towed. Asphalt/emulsion pre-coat cart 6 is shown with a tack transport pipe 230 extending from the tack/emulsion pump 10 to the front tack spray bar 3. Front tack spray bar 3 can be height adjustable to assist in proper tack coating.

Figure 3:
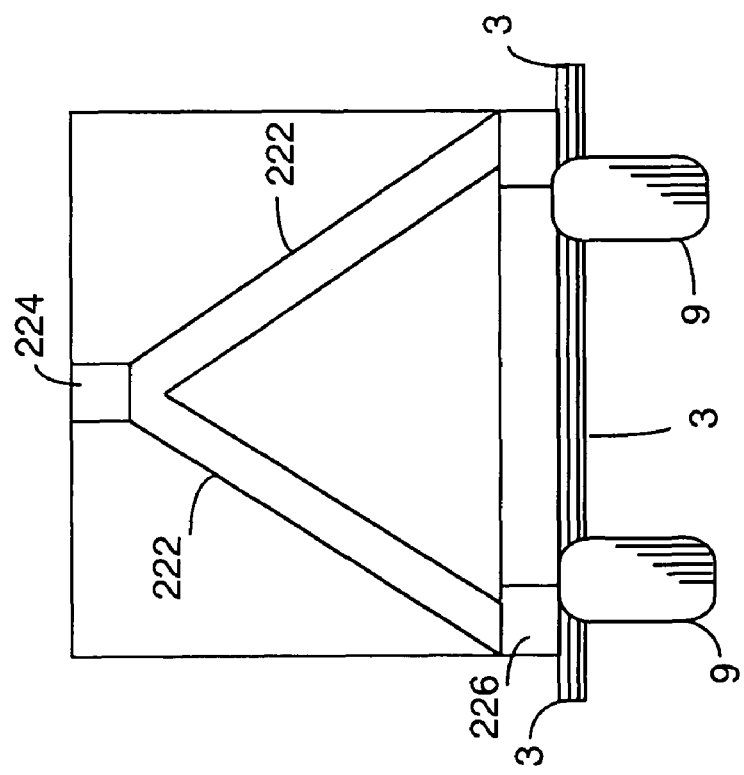
FIG. 3 is a front view of the asphalt/emulsion pre-coat cart 6 of FIGS. 1-2.

Now referring to FIG. 3, there is shown a front view of the asphalt/emulsion pre-coat cart 6.

Figure 4:
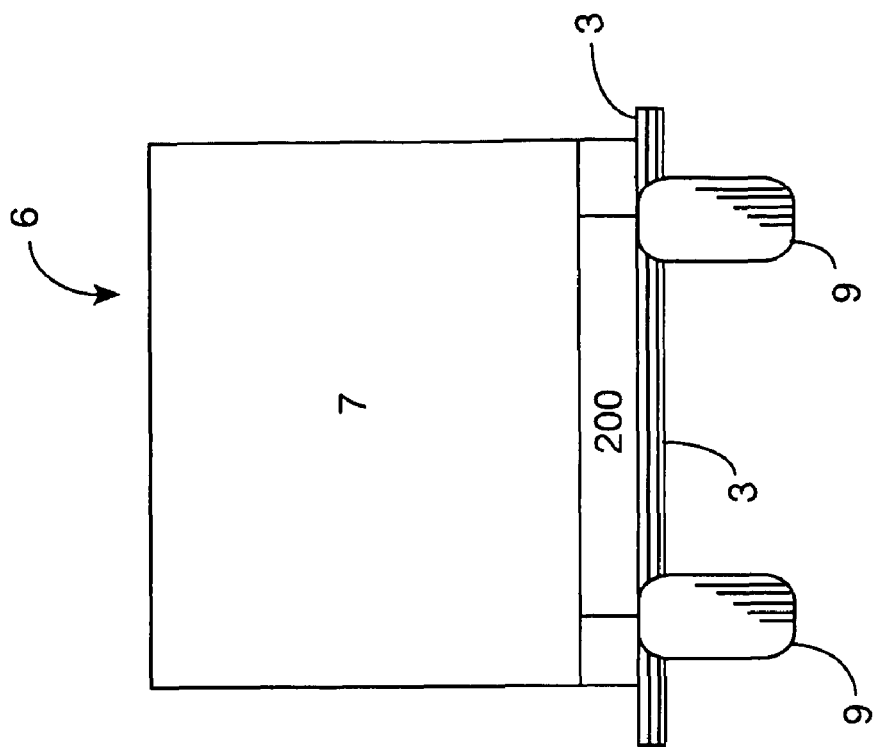
FIG. 4 is a rear view of the asphalt/emulsion pre-coat cart 6 of FIGS. 1-3.

Now referring to FIG. 4, there is shown a rear view of the asphalt/emulsion pre-coat cart 6.

Now referring to FIG. 5, there is shown a view of the front tack spray bar 3, which may be tailored to spray just between the wheels of the paver 2 pushing the asphalt/emulsion pre-coat cart 6 or between the paver wheels and outside of the paver wheels, but not where the paver wheels will contact the surface, or across the entire width of the area to be coated with tack. The tack adjustable spray nozzles can be adjusted for direction and flow amounts or even turned completely off (where it is desired to spray both inside the paver wheel tracks and outside).

Now referring to FIG. 6, there are shown rear tack spray bars 4 (LH and RH) with tack adjustable spray nozzles disposed to spray over the areas which were 1) not sprayed by the front tack spray bar 3; and 2) which were driven over by the paver 2 wheels or tracks.

Now referring to FIG. 7, there is shown an alternate embodiment of an asphalt/emulsion pre-coat cart 6 of the present invention, which includes a cover (aluminum or other material) with preferably approximately two inches of insulation over and around the tack/emulsion tank 7. Also shown is a solid tire on a front caster 9 and a pneumatic tire on a rear caster 9. A rear support beam 71 is shown to support the weight of the tack/emulsion tank 7. Similarly, a front support beam 72 is shown, as well as a relocated diesel fuel-fired hot oil tank heater 8. Tack/emulsion pumps 10 and hot oil heater circulation pumps 11 are also shown, without the detailed flow circuitry. Also shown is a rear connector 73 which securely couples the asphalt/emulsion pre-coat cart 6 with the paver 2 in at least two dimensions.

Figure 8:
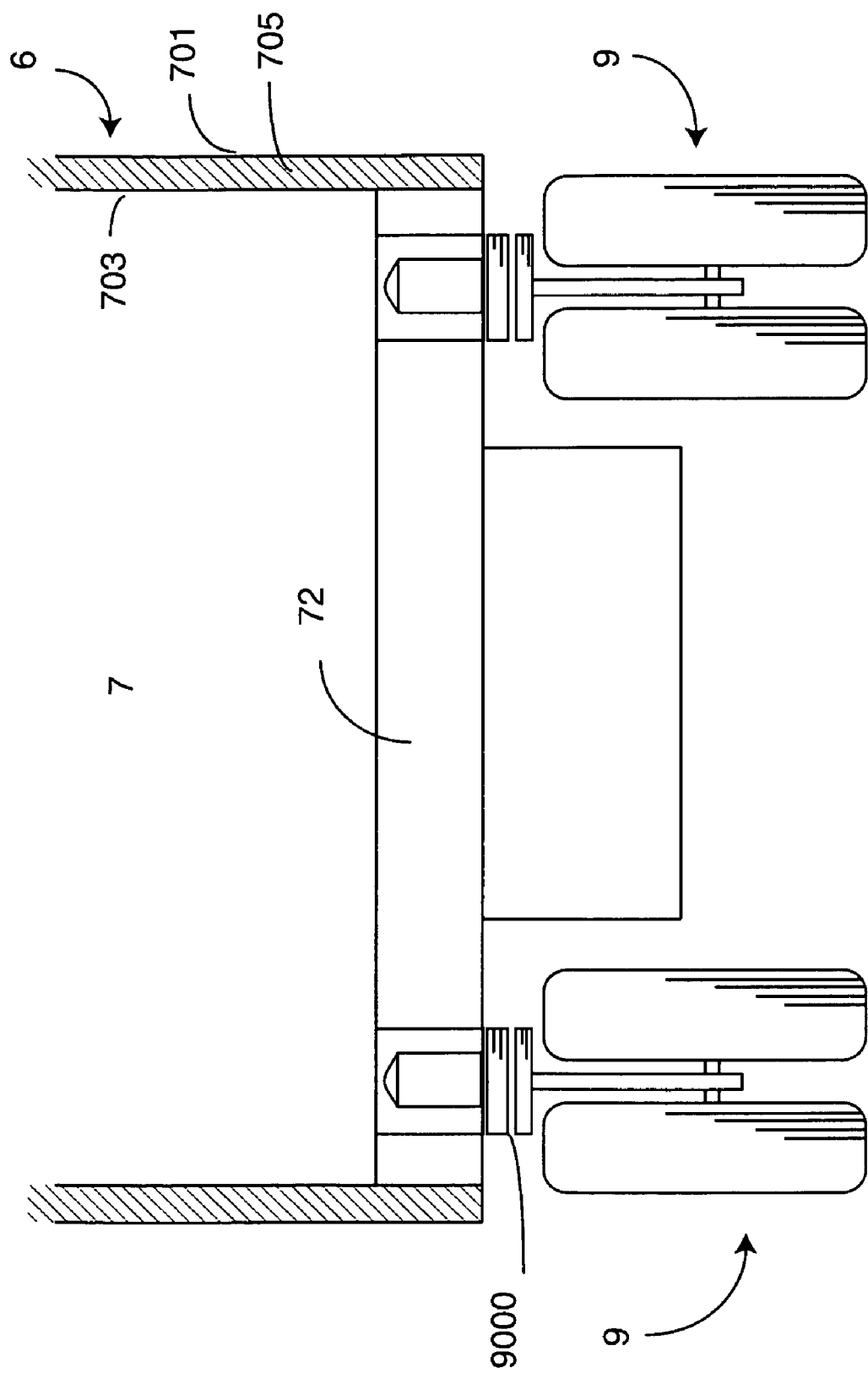
FIG. 8 is a cross-sectional view of the asphalt/emulsion pre-coat cart taken on lines C-C of FIG. 7.

Now referring to FIG. 8, there is shown a view of the asphalt/emulsion pre-coat cart 6 taken on line C-C of FIG. 7. The casters 9 are shown each as a pair of dual wheels on an axle coupled to the asphalt/emulsion pre-coat cart 6 by a swivel 9000. Note that during towing, the swivels 9000 could be locked.

Figure 9:
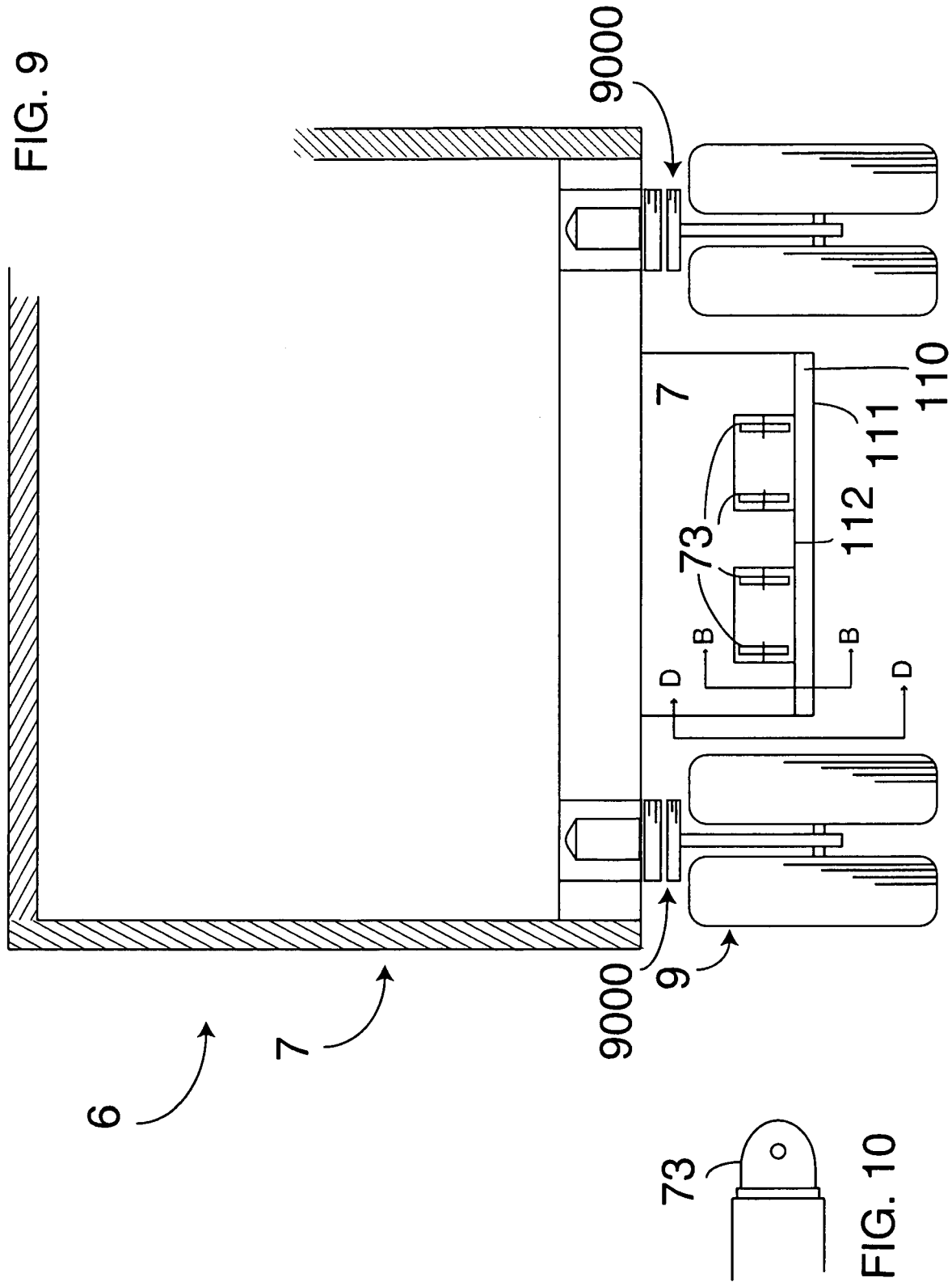
FIG. 9 is a cross-sectional view of the asphalt/emulsion pre-coat cart taken on lines A-A of FIG. 7.

Now referring to FIG. 9, there is a view of the asphalt/emulsion pre-coat cart 6 taken on line A-A of FIG. 7. Shown are the rear connectors 73, as well as the bottom outer skin 111, floor insulation 110 and the inner bottom 112. Rear connector 73 could be self-guiding/blind mateable quick connectors with locking pins or other latching mechanisms.

Figure 10:
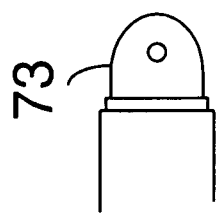
FIG. 10 is a cross-sectional view of the connector taken on lines B-B of FIG. 9.

Now referring to FIG. 10, there is a cross-sectional view taken on line B-B of FIG. 9, which shows the rear connector 73 with a locking pin receiving hole therein for mating with a pin inserted through a mating connector disposed on the front of the paver 2. Note: paver 2 may be a prior art general purpose paver with aftermarket connectors disposed thereon which are added to mate with the rear connector 73, or connectors could be incorporated into new general purpose pavers.

Figure 11:
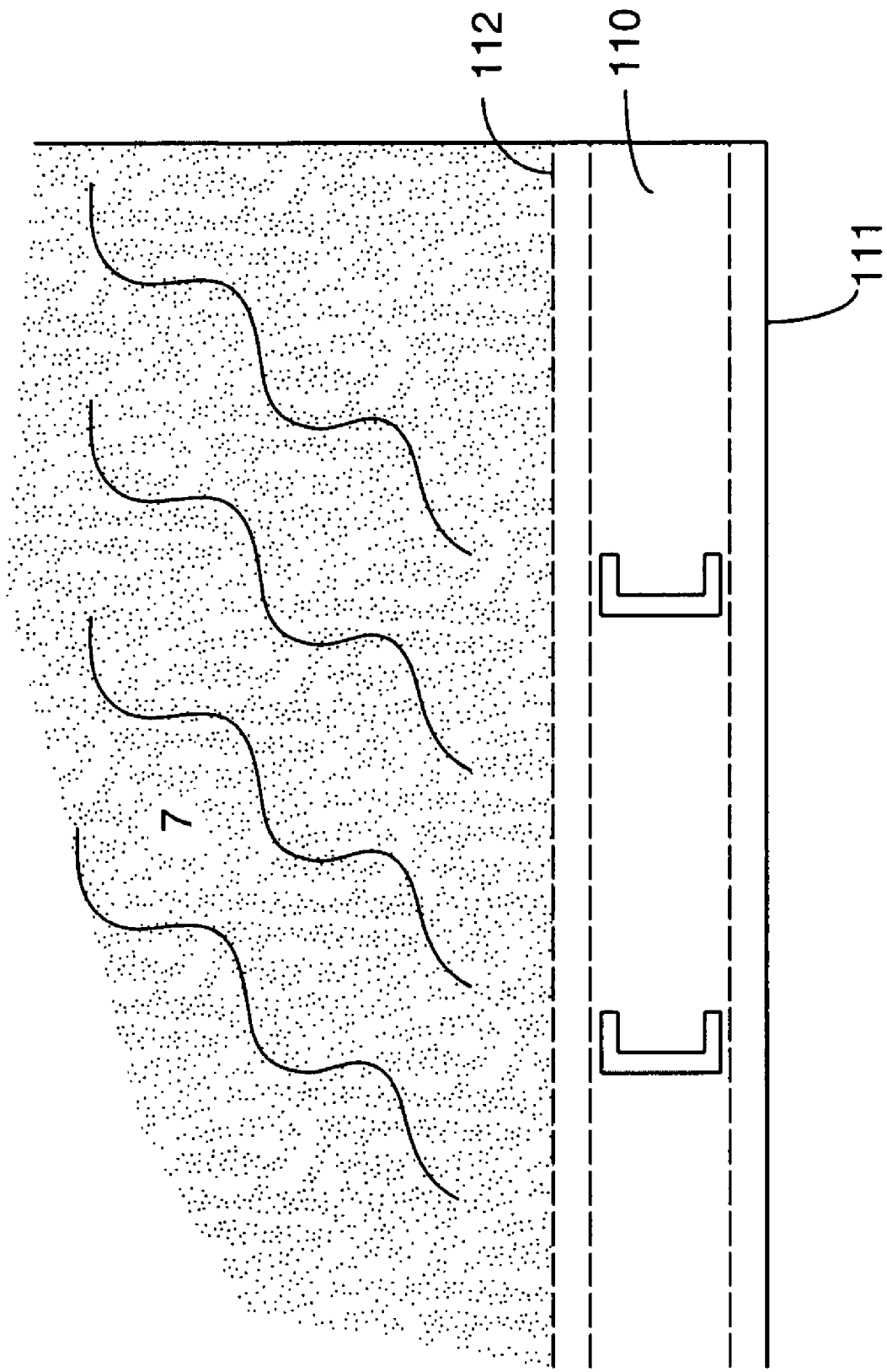
FIG. 11 is a cross-sectional view of the tack/emulsion tank bottom taken on lines D-D of FIG. 9.

Now referring to FIG. 11, there is shown a view taken on line D-D of FIG. 9, which shows a bottom section of the tack/emulsion tank 7 which includes a bottom outer skin 111, a floor insulation 110 and an inner bottom 112. Numerous ways of insulating the tack/emulsion tank 7 can be accomplished. In an alternate embodiment, the exhaust from oil heater exhaust port 810 (FIG. 12) can be circulated through voids in the exterior of tack/emulsion tank 7 when the floor insulation 110 is eliminated or partially eliminated in sections.

Now referring to FIG. 12, there is shown a cross-sectional view of the diesel fuel-fired hot oil tank heater 8 taken on line E-E of FIG. 7. There is shown a blower 802 for creating a central column of airflow through the diesel fuel-fired hot oil tank heater 8. Oil inlet 804 couples to a central heating oil coil 805 through which oil is pumped and heated as it contacts the heated air from the fire created by ignition of the fuel provided by diesel fuel supply line 808. Heating oil coil 805 is coupled to oil outlet 806, which eventually couples (not shown), to tank bottom heating grid coil 814. Oil heater outer skin cylinder 812 forms the outside of diesel fuel-fired hot oil tank heater 8 and helps to contain the flowing heated air which is blown out oil heater exhaust port 810.

Now referring to FIG. 13, there is shown a simple cross-sectional view of a side of tack/emulsion tank 7 taken on line F-F of FIG. 12, with the oil heater exhaust port 810 passing through a segment of the insulated wall of tack/emulsion tank 7. Note: In some embodiments, having the oil heater exhaust port 810 coupled to and heating a jacket, comprising exterior wall skin 701, wall insulation 705 and interior wall 703, around the tack/emulsion tank 7, could be done in lieu of the insulating jacket, or hot oil heated jacket embodiments.

Now referring to FIG. 14, there is shown a cross sectional view of diesel fuel-fired hot oil tank heater 8 taken on line G-G of FIG. 12.

Now referring to FIG. 15, there is shown a side view of an alternate asphalt/emulsion pre-coat cart 6 of the present invention which includes a hydraulic leg 150 used to lift asphalt/emulsion pre-coat cart 6 for coupling to a pintle hook on a vehicle via the pintle hook 154 on the pivoting pintle arm 152 coupled to the asphalt/emulsion pre-coat cart 6.

Figure 16:
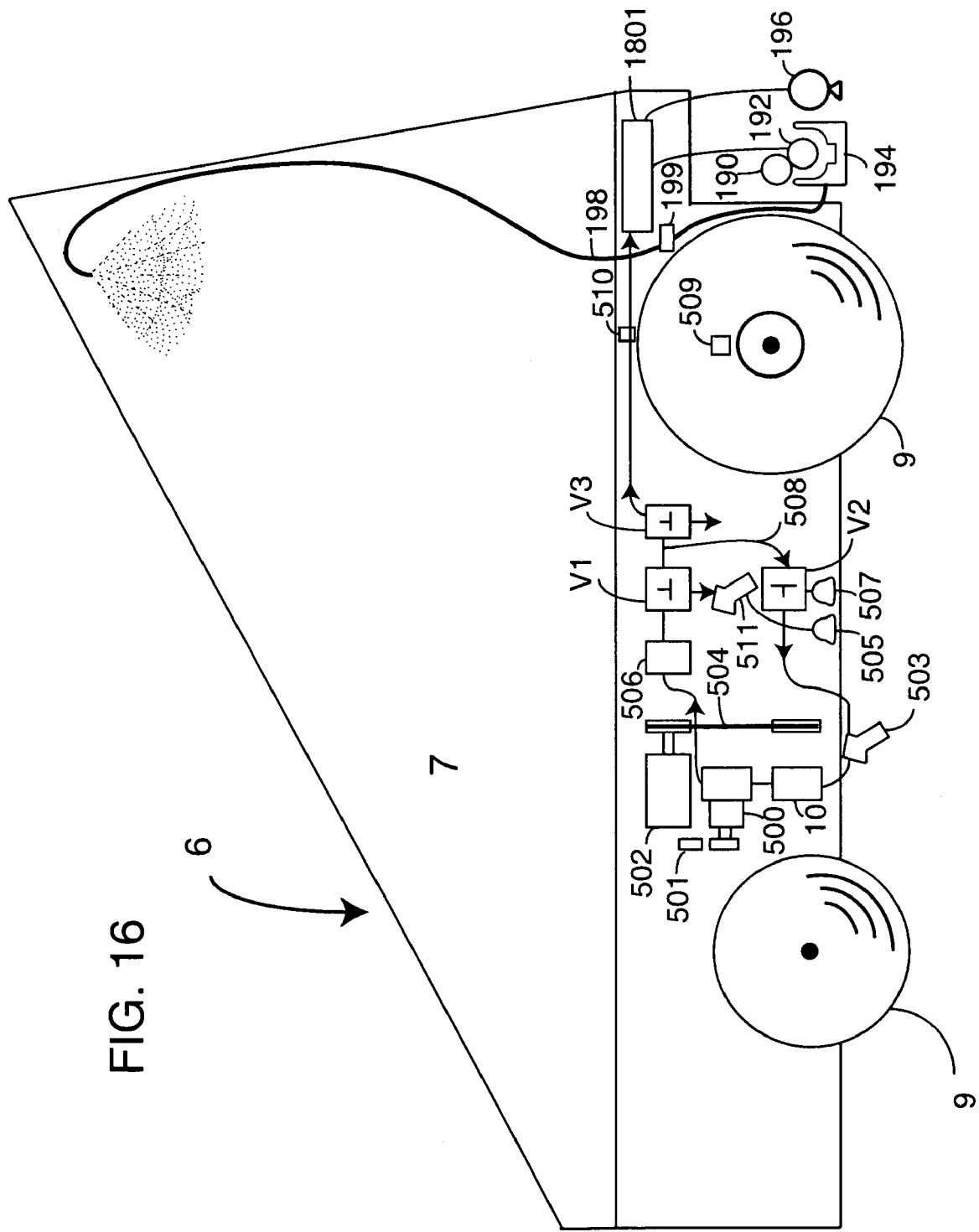
FIG. 16 is a Tach/emulsion pumping circuit of an alternate embodiment of the present invention.

Now referring to FIG. 16, there is shown a side view of a tach/emulsion pumping circuit with a tach/emulsion meter 500 coupled to the tack/emulsion pump 10, driven by electric motor 502, via belt 504. Tach/emulsion meter 500 can be a volumetric or gravimetric meter and be adjacent to pulse pick up or rotary encoder 501 for liquid tach volume measurements with temperature correction. Suck back line 508 is also shown. A pressure relief valve 506 is shown coupled inline with the output of tach/emulsion meter 500. Thermocouple 510 is shown inline to the distribution manifold 180. Also shown are strainers 503 and 511 and return to tank port 505, tank suction port 507 and pulse pickup or rotary encoder 509 for distance measurement.

Tach/emulsion distribution manifold 1801 is coupled to a variable width exterior spray bar 192. Variable width exterior spray bar 192 is configured to be movable to and from an operational extended position to a retracted stowed position via a manually or electronically controlled hydraulic spray bar extender cylinder 190.

In one embodiment of the present invention, the variable width exterior spray bar 192 does not have individually controllable nozzles, and the tack coat spray is sprayed out each nozzle when the variable width exterior spray bar 192 is under pressure from the supply line. When variable width exterior spray bar 192 is deployed to a full width configuration, it extends from a position in alignment with an outside edge of the tires or tracks of the paver 2 to a full width of the screed 2000. As the variable width exterior spray bar 192 is retracted, portions of the nozzles would, unless otherwise prevented from doing so, spray tack coat on the surface in a path to be run over by the tires or tracks of the paver 2. To stop this unwanted spraying, a central fixed tach/emulsion catch basin 194 is placed across the width of the cart which is preferably the same width as the distance between the outside edges of the tires or tracks of the paver 2. Central fixed tach/emulsion catch basin 194 captures the spray from the nozzles of variable width exterior spray bar 192 when it is not fully deployed. This permits the width of the sprayed tack coat to be adjusted without changing the tack or emulsion which is being supplied to the variable width exterior spray bar 192. The emulsion is captured in the central fixed tach/emulsion catch basin 194 and then pumped back, via line 198 and pump 199 to the tack/emulsion tank 7, where it can be heated and provided for further applications. The fixed central spray bar 196 is coupled to distribution manifold 1801. In some embodiments of the present invention, the asphalt/emulsion pre-coat cart 6 might be made to be easily used between different pavers with different widths. In such case, an extra wide fixed central spray bar 196 is provided, with a pair of movable tach/emulsion catch basins (not shown) on the ends of the fixed central spray bar 196 so as to control the width of the spray to accommodate the width of different pavers. It should be understood that the fixed central spray bar 196 and the variable width exterior spray bar 192 both could be made with controllable nozzles, either by an individual mechanical adjustment or via some electronic remote control from control system computer 13. In such configurations, it will likely be needed to also have the control system computer 13 control the pressure in the tach/emulsion supply lines, so as to provide a controllable rate of flow of material being sprayed.

In a preferred embodiment, hydraulic spray bar extender cylinder 190 might be coupled to variable width exterior spray bar 192, and a potentiometer or other sensor which allows for automatic extension and/or control of nozzles, flow regulators, etc. of variable width exterior spray bar 192 when the screed 2000 is extended. Note: variable width exterior spray bar 192 has a width which is determined by the screed width. Automatic controls of the variable width exterior spray bar 192 could be coupled with sensors and controls relating to the width of screed 2000. Note: the structure supporting variable width exterior spray bar 192, central fixed tach/emulsion catch basin 194, fixed central spray bar 196 and hydraulic spray bar extender cylinder 190 is omitted from the figure to provide for a simplified and more easily understandable view conveying the most innovative concepts. Various support structures would be needed.

Figure 17:
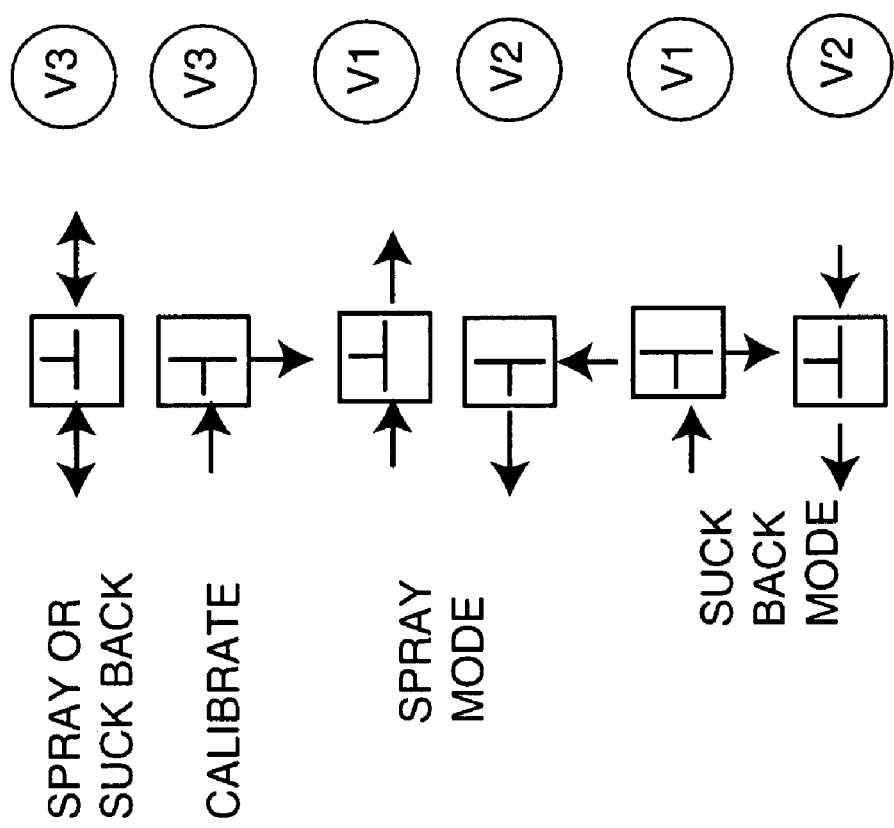
FIG. 17 is a depiction of various valve orientations for the several modes of operation of the asphalt/emulsion pre-coat cart of FIG. 16.

Now referring to FIG. 17, there is shown a display of valve orientations as a function of operational mode, including spray, suck back and calibrate.

Figure 18:
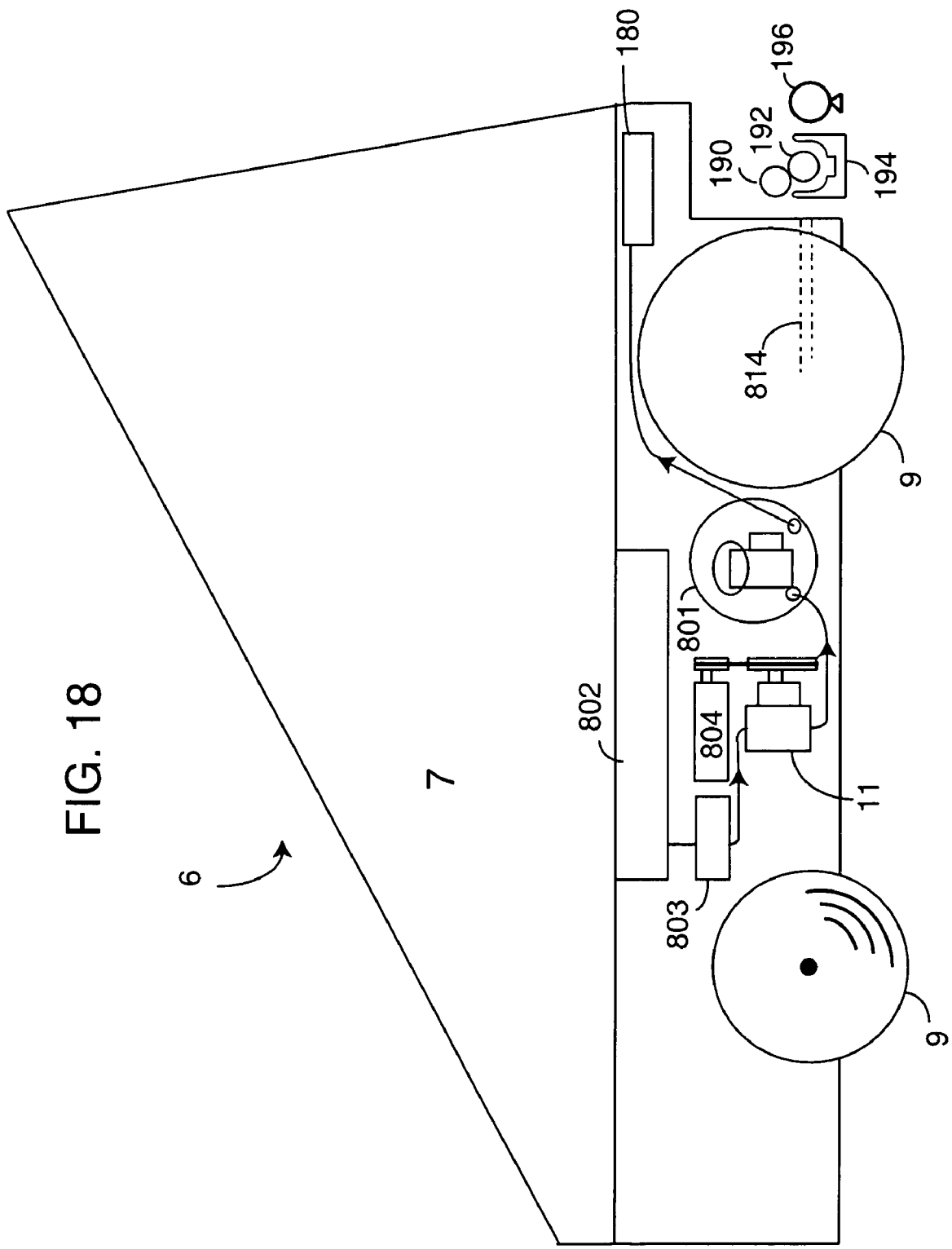
FIG. 18 is a heating oil circuit diagram of an alternate asphalt/emulsion pre-coat cart of the present invention.

Now referring to FIG. 18, there is shown a heating oil circuit of the present invention which shows the oil heating system in relation to the asphalt/emulsion pre-coat cart 6. It should be understood that the purpose of the oil heating system is to heat the tach/emulsion wherever it is located, so that it does not cool and thereby solidify. The oil heating system includes an alarm which sounds if the oil temperature drops below a certain point, which would indicate the increased potential for solidification of the tach/emulsion. Each of the hot oil lines may be insulated to limit heat loss, and each may be deployed so as to provide heat to portions of the tach/emulsion flow circuit. The hot oil heating system is a continuously recycling system which provides for heating of the oil, and then pumping it to areas where heat is needed, and returning the cooler oil to be heated again by oil heater 801.

Figure 19:
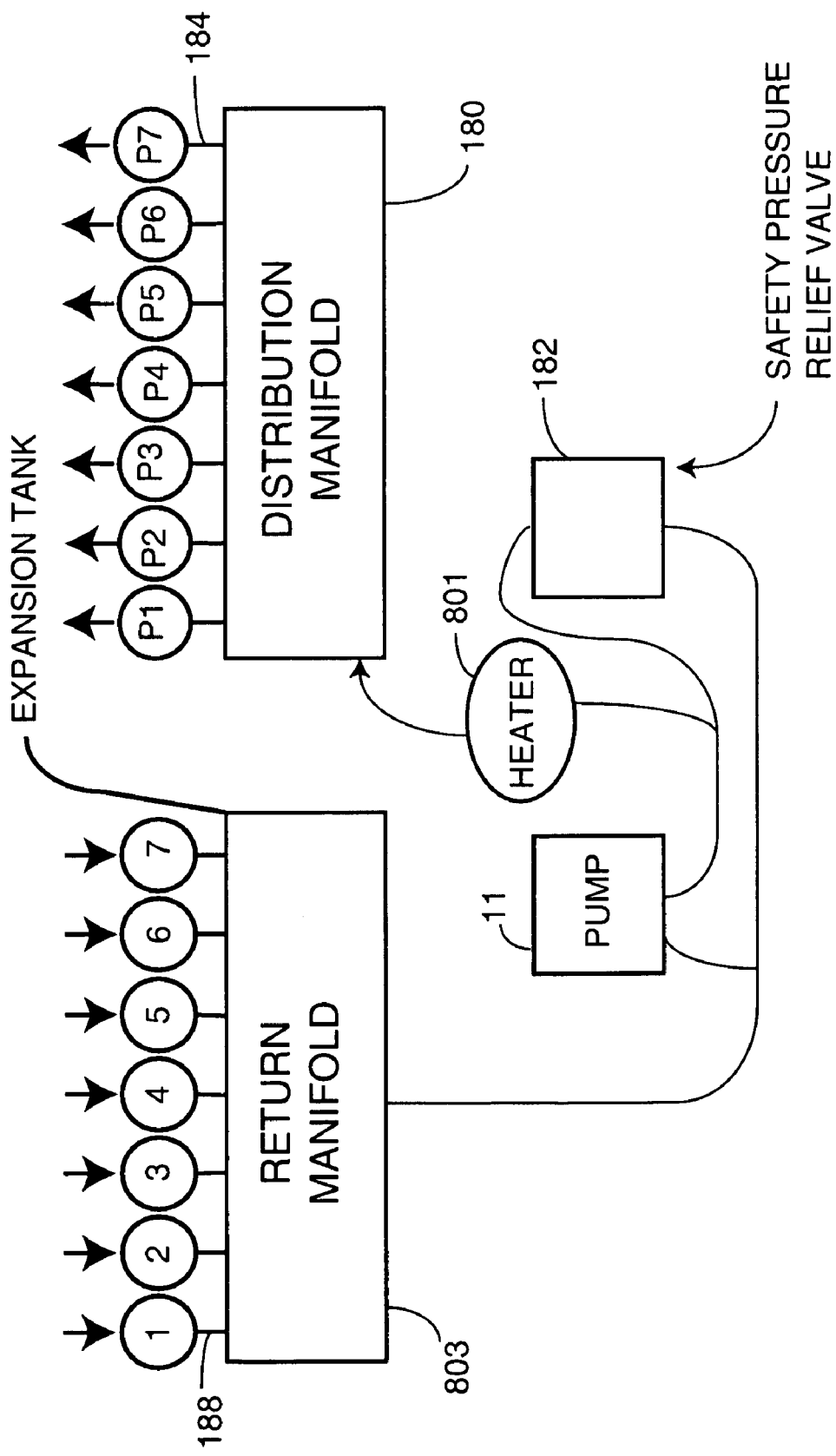
FIG. 19 is a detailed depiction of the heater circuit of the asphalt/emulsion pre-coat cart of FIG. 18.

One example of a hot oil flow circuit can be understood by now referring to FIG. 19, which shows a system in a schematic format. The lines or pipes labeled P1-P7 represent the various hot oil lines around the asphalt/emulsion pre-coat cart 6 as needed. In one embodiment, P1 could be a line to the tank bottom heating grid coil 814; P2 could be a line to the tack pump, meter and associated piping; P3 could be a line to heat the fixed central spray bar 196 and associated piping; P4 could be a line to heat the one side of the variable width exterior spray bar 192, and associated piping; P5 could be a line to heat the other side of the variable width exterior spray bar 192, and associated piping; P6 could be lines which extend from the asphalt/emulsion pre-coat cart 6 back to one side of the rear tack spray bar 4 behind the tires of the paver, and associated piping; and P7 could be the lines which would extend back to the other side of the rear tack spray bar 4, and associated piping.

Figure 20:
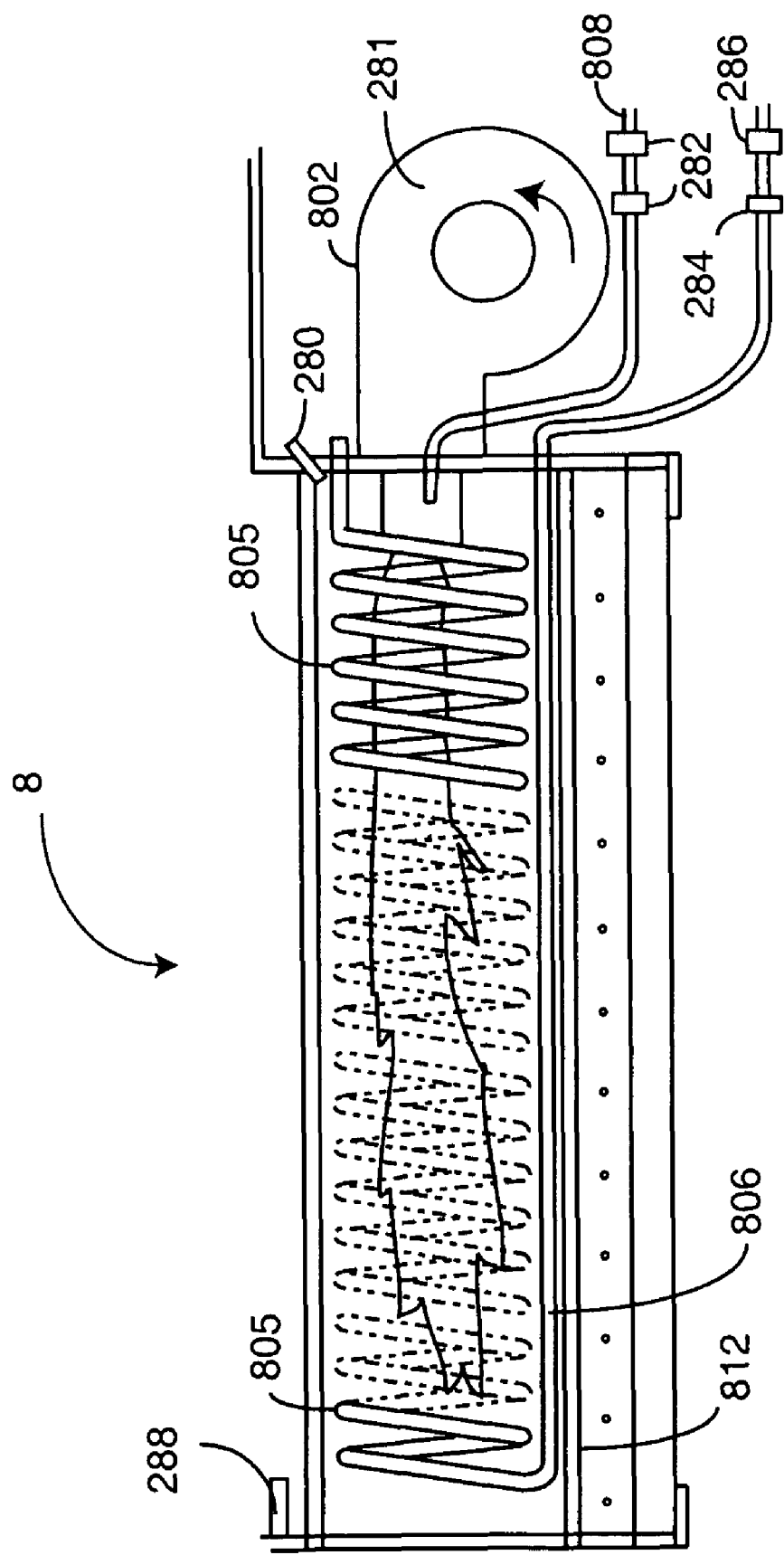
FIG. 20 is a detailed view of the oil heater of FIG. 12.

Now referring to FIG. 20, there is shown a detailed drawing of the diesel fuel-fired hot oil tank heater 8 which includes a flame detector 280, airflow detector 281, diesel flow blocking valves 282, oil temperature sensor 284, hot oil flow sensor 286, as well as a sensor 288 for tack level in the tack/emulsion tank 7, so as to preclude firing the diesel fuel-fired hot oil tank heater 8 when the oil heater outer skin cylinder 812 is not completely covered by tack/emulsion in the tack/emulsion tank 7. Note: if the diesel fuel-fired hot oil tank heater 8 is not located inside of tack/emulsion tank 7, the need for sensor 288 would be eliminated.

Figure 21:
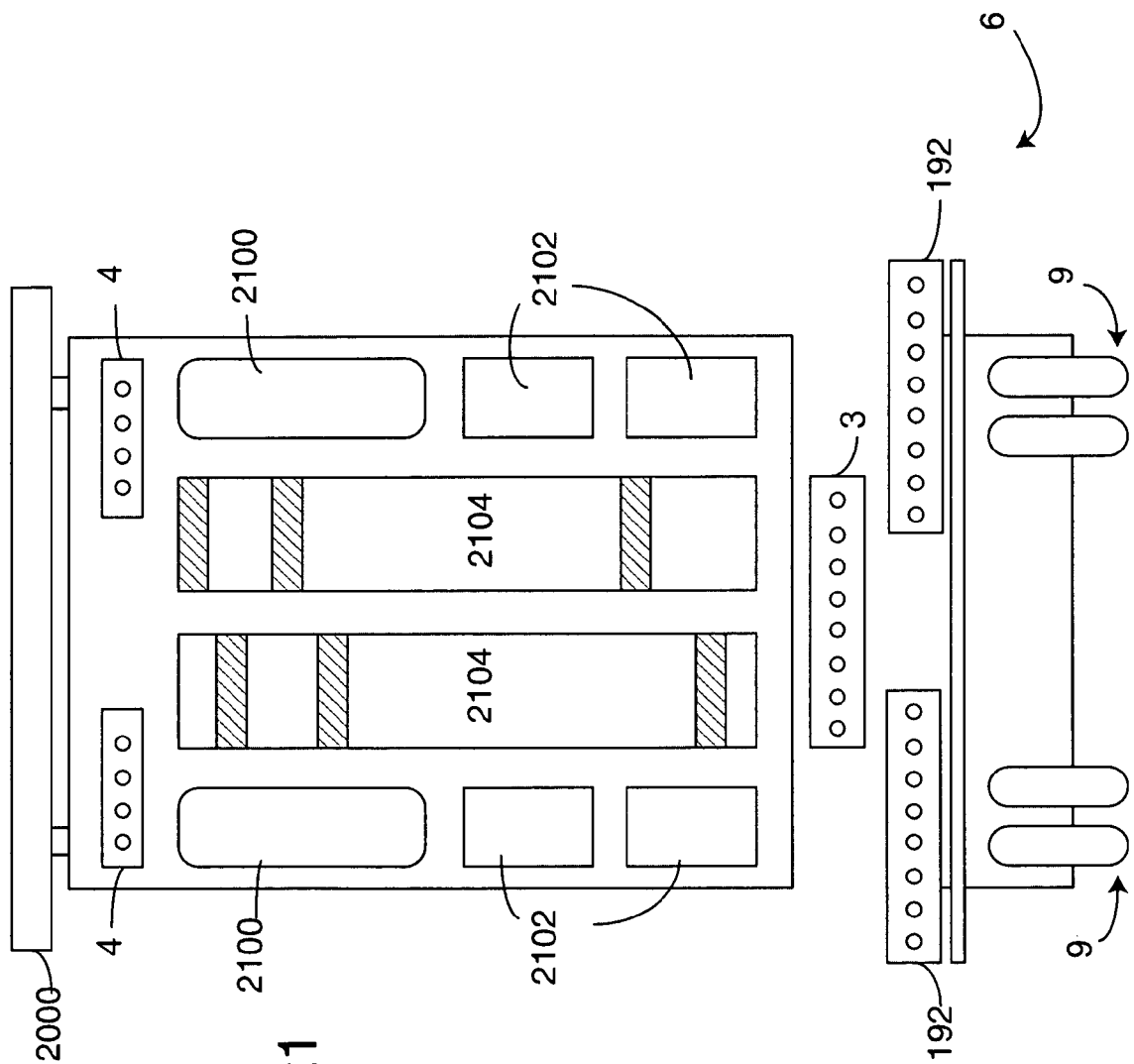
FIG. 21 is a simplified bottom-up view of the combination of the paver 2 and the asphalt/emulsion pre-coat cart of the present invention.

Now referring to FIG. 21, there is shown a simplified view of an underside of the paver 2 and a portion of the asphalt/emulsion pre-coat cart 6 of the present invention. This figure is not intended to show all of the details disclosed elsewhere in this description, but merely to provide a simple view which may help visually tie together the various components. There are shown rear wheels 2110 and front wheels 2102 (which could be covered with tracks or otherwise configured for use in a tracked system). Slat conveyors 2104 are shown in a manner which is typical to prior art slat conveyors. It should be understood that that remix pavers with augers may be also used.

The asphalt/emulsion pre-coat cart 6 could be constructed with 220 volt, 3 phase power from the paver generator, or could have its own generator. The blower 802 could be a ½ HP, while the hot oil heater circulation pump 11 could be 2 HP and the tack/emulsion pump 10 could be 3 HP. Control system computer 13 could be powered by a low voltage battery kept charged by a charger powered by a generator. The power requirements above for electrical and pumping, etc. are merely examples of one of countless variations which could be utilized to meet the particular needs of any one system.

It is believed that when these teachings are combined with the known prior art by a person skilled in the art of asphalt paving and paving equipment design and operation, many of the beneficial aspects and the precise approaches to achieve those benefits will become apparent.

It will be understood that certain features and sub-combinations are of utility and may be employed without reference to other features and sub-combinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

I claim:

1. A hot mix asphalt (HMA) paving system comprising:
a paver comprising a right side surface contacting drive system and a left side surface contacting drive system;
means for applying a first segment of a pre-coat of tack emulsion on a road surface immediately ahead of the paver, which paver is configured to apply a layer of HMA over the pre-coat of tack emulsion;
means for spraying in a segmented pre-coat tack pattern, which does not extend substantially uninterrupted along a line behind the paver spanning from across the right side surface contacting drive system to an opposite side of the left side surface contacting drive system and still ahead of a point where HMA is unloaded and dropped down to the road surface;
wherein the means for applying comprises a wheeled cart configured to be pushed by and in front of the paver;
a heated reservoir of tack emulsion and a tack emulsion pump;
a front tack spray bar coupled to and receiving heated tack emulsion from the tack emulsion pump, the front tack spray bar configured to spray tack emulsion in front of the paver;
wherein the front tack spray bar sprays tack emulsion across the surface in front of the paver, but not substantially in front of portions of the surface over which the paver will contact the surface;
wherein the front tack spray bar is a fixed central spray bar, and the system further comprises a variable width exterior spray bar configured to spray a tack coat substantially outside of a path of wheels of the paver; and
wherein the variable width exterior spray bar is disposed above a central fixed catch basin which captures tack emulsion when sprayed from the variable width exterior spray bar when the variable width exterior spray bar is not fully deployed for a maximum tack coat spray pattern width.

2. The system of claim 1 wherein the right side surface contacting drive system comprises at least a right front wheel and a right rear wheel.

3. The system of claim 1 wherein the means for applying further comprises a computer control system for controlling pressure and temperature of the tack emulsion being pumped to the front tack spray bar.

4. The system of claim 1 wherein the means for spraying further comprises a rear tack spray bar coupled to a rear portion of the paver and behind at least one of the right side surface contacting drive system and the left side surface contacting drive system and ahead of a screed coupled to the paver.

5. The system of claim 4 wherein the rear tack spray bar further comprises a right rear tack spray bar separated from a left rear tack spray bar which are coupled to and receiving tack emulsion from the tack emulsion pump.

6. The system of claim 1 further comprising a tack return pump and return flow line coupled to and extending from the central fixed catch basin, so as to return emulsion captured in the central fixed catch basin to the heated reservoir.

7. A method of paving an asphalt road comprising the steps of:
applying, on a surface for receiving a layer of hot mix asphalt (HMA), with a front tack spray bar, a first segment of a pre-coat of tack emulsion on the surface ahead of a paver, which paver is configured to apply the layer of HMA;
providing a paver with a right side surface contacting drive system and a left side surface contacting drive system with a rear tack spray bar disposed and configured to spray tack emulsion behind the right side surface contacting drive system and the left side surface contacting drive system and ahead of a point where HMA is applied on the surface;
spraying a second segment of the pre-coat of tack emulsion behind the right side surface contacting drive system and the left side surface contacting drive system, but in a segmented pre-coat tack pattern which is substantially non-continuous along a line behind the paver which is receiving the layer of HMA;
providing a variable width exterior spray bar and applying the first pattern substantially only in a non-wheel contact pre-coat area on the surface other than where the right side surface contacting drive system and the left side surface contacting drive system contact the surface as the paver passes over the surface; and
wherein the non-wheel contact pre-coat area has a variable width which is less than a maximum variable width and further comprising the steps of:
providing a catch basin for capturing tack emulsion sprayed by the variable width exterior spray bar which would otherwise cover an area of the surface which would be beneath the paver during paving operations.

8. The method of claim 7 wherein the segmented pre-coat tack pattern comprises an area disposed behind the right side surface contacting drive system and the left side surface contacting drive system which has a substantially higher concentration of tack emulsion than a central area disposed between the right side surface contacting drive system and the left side surface contacting drive system.

9. The method of claim 7 wherein the step of applying, with a front tack spray bar, a first segment of a pre-coat of tack emulsion, further comprises fixing the front tack spray bar in a central location and applying the first segment substantially only in a pre-coat area on the surface between where the right side surface contacting drive system and the left side surface contacting drive system contact the surface as the paver passes over the road surface.

10. The method of claim 7 further comprising the step of moving emulsion from the catch basin to a heated reservoir where it is available to be later provided to the front tack spray bar and the variable width exterior spray bar.

11. The method of claim 10 wherein the step of moving emulsion further comprises:
providing a return line from the catch basin to the reservoir and a pump coupled to the return line.

12. A system for paving a road comprising:
a paver having a right side wheel set and a left side wheel set;
a screed coupled to and pulled behind the paver;
a cart having a caster thereon which permits the cart to roll in any direction over a road surface;
the cart positioned and configured to be pushed forward by a front portion of the paver when the paver is operated to pave an HMA road surface;
the cart further comprising:
a tack emulsion tank, for holding tack emulsion to be sprayed on a road surface;
a tack emulsion pump configured to pump tack emulsion from the tack emulsion tank;

an oil heater circulation pump which is configured to distribute hot oil to heat the tack emulsion as it is being pumped;

an oil tank heater configured to heat oil to create the hot oil;

a variable width front tack spray bar system coupled to and receiving tack emulsion from the tack emulsion pump and configured to spray tack emulsion on a wide road surface ahead of the paver, but substantially except where the right side wheel set and the left side wheel set contact the road surface as the paver pushes the cart;

a catch basin disposed below said variable width front tack spray bar system to capture tack when said front tack spray bar system is not fully deployed;

a rear tack spray bar system coupled to and receiving tack emulsion from the tack emulsion pump and further coupled to a rear portion of the paver behind the right side wheel set and the left side wheel set; and configured to spray substantially more tack emulsion in areas on the surface where the front tack spray bar did not spray tack emulsion and substantially less tack emulsion on areas of the road surface where the front tack spray bar did spray tack emulsion.

* * * * *